(12) United States Patent
Hofmann et al.

(10) Patent No.: US 10,420,273 B2
(45) Date of Patent: Sep. 24, 2019

(54) RELEASABLE LOCK FOR REAR FOLDING IMPLEMENT WINGS

(71) Applicant: Schulte Industries Ltd., Englefeld, Saskatchewan (CA)

(72) Inventors: Todd Hofmann, Saskatoon (CA); Vincent Colistro, Saskatoon (CA)

(73) Assignee: SCHULTE INDUSTRIES LTD., Englefeld (CA)

( * ) Notice: Subject to any disclaimer, the term of this patent is extended or adjusted under 35 U.S.C. 154(b) by 337 days.

(21) Appl. No.: 15/581,591

(22) Filed: Apr. 28, 2017

(65) Prior Publication Data

US 2018/0110177 A1  Apr. 26, 2018

(30) Foreign Application Priority Data

Oct. 26, 2016  (CA) ..................... 2946491

(51) Int. Cl.

| A01B 63/00 | (2006.01) |
|---|---|
| A01B 73/04 | (2006.01) |
| A01B 76/00 | (2006.01) |
| A01B 63/22 | (2006.01) |
| A01B 73/06 | (2006.01) |
| A01B 23/06 | (2006.01) |

(52) U.S. Cl.
CPC .............. *A01B 76/00* (2013.01); *A01B 63/22* (2013.01); *A01B 73/048* (2013.01); *A01B 73/067* (2013.01); *A01B 23/06* (2013.01)

(58) Field of Classification Search
CPC ......... A01B 23/06; A01B 63/22; A01B 63/32; A01B 73/067; A01B 73/048; A01B 73/062; A01B 73/042; A01B 73/046; A01B 73/02; A01B 73/065; A01B 49/06; A01B 76/00; A01C 5/062; A01C 23/008
USPC .......... 56/367, 377, 397; 172/311, 322, 776, 172/663, 666, 667, 452, 456; 239/159, 239/167
See application file for complete search history.

(56) References Cited

U.S. PATENT DOCUMENTS

| 3,539,016 A | 11/1970 | Bauer et al. |
|---|---|---|
| 3,640,345 A | 2/1972 | Sosalla et al. |
| 4,418,762 A | 12/1983 | Page |
| 4,821,809 A | 4/1989 | Summach et al. |
| 7,581,597 B2 | 9/2009 | Neudorf et al. |
| 7,861,795 B2 | 1/2011 | Dillon |

(Continued)

*Primary Examiner* — Robert E Pezzuto
(74) *Attorney, Agent, or Firm* — King & Schickli, PLLC

(57) ABSTRACT

An agricultural implement has a center frame supported on center wheels and right and left interframes are pivotally attached to corresponding ends of the center frame about wing pivot axes. Right and left wing frames are pivotally attached at front inner ends thereof to front ends of corresponding interframes about front interframe pivot axes. Rear inner portions of the wing frames are movably attached to corresponding interframes. Latch mechanisms selectively lock the rear inner portions each wing frame to rear portions of the corresponding interframes. A center actuator pivots the center frame such that the frames move from an operating position extending rearward to an initial transport position extending upward where the interframes and wing frames can pivot rearward about the upright wing pivot axes. The front interframe pivot axes are oriented perpendicular to the wing pivot axes.

20 Claims, 18 Drawing Sheets

(56) References Cited

U.S. PATENT DOCUMENTS

| | | | |
|---|---|---|---|
| 8,342,256 B2 * | 1/2013 | Adams | A01B 73/02 172/311 |
| 9,198,342 B2 | 12/2015 | Friggstad | |
| 9,795,071 B2 * | 10/2017 | Friggstad | A01B 73/067 |
| 9,974,224 B2 * | 5/2018 | Sudbrink | A01B 73/046 |
| 9,999,172 B2 * | 6/2018 | Sudbrink | A01B 3/26 |

* cited by examiner

RELEASABLE LOCK FOR REAR FOLDING IMPLEMENT WINGS

This disclosure relates to the field of agricultural implements and in particular a releasable wing lock for implements with rear folding wing sections.

BACKGROUND

A common type of wide agricultural implement includes right and left wing frames pivotally attached to a center frame where the wing frames fold rearward for transport. Ground engaging tools such as discs, harrows and packers are mounted on the center and wing frames.

A hitch frame is mounted on center wheels at a rear end thereof and extends forward from the center wheels to a hitch tongue adapted to be attached to the drawbar of a towing vehicle. A center frame is pivotally mounted on the rear end of the hitch frame about a hitch pivot axis that is perpendicular to the operating travel direction. Right and left elongate wing tool bars are in turn pivotally attached to outer ends of the center frame about right and left wing pivot axes that are aligned with the operating travel direction when in the operating position so that the wing frames can pivot up and down with respect to the center frame to follow ground contours. Wing operating wheels are attached to outer portions of each wing to support the wings in the operating position.

For transport the rear end of the center frame is pivoted upward about the hitch pivot axis and the rear ends of the wing frames, attached to the center section, follow the center section and pivot upward moving the ground engaging tools above the ground. Typically as the wing frames pivot upward, wing transport wheels move down into contact with the ground and the wing operating wheels are raised above the ground. The wing operating wheels are oriented to roll in the operating travel direction when the wings are in the operating position, and the wing transport wheels are oriented to roll perpendicular to the operating travel direction. Thus when the rear ends of the center and wing frames are raised to a position where the wing pivot axes is generally vertical, the operator can move the implement forward in the operating travel direction and as the center frame moves in the operating travel direction, the wing frames move to a position trailing behind the center frame and substantially aligned with the operating travel direction.

This system is commonly used in lighter implements such as harrows where the wing frames comprise simply a single laterally extending member, such as disclosed in U.S. Pat. No. 4,821,809 to Summach, et al., U.S. Pat. No. 4,418,762 to Page, U.S. Pat. No. 3,640,345 to Sosalla, and U.S. Pat. No. 3,539,016 to Bauer et al.

Heavier implements with rear folding wing frames are also known. U.S. Pat. No. 7,581,597 to Neudorf et al. discloses an air seeder implement with no center section and with rear folding wings where again the wing frames comprise simply a single laterally extending member to which the ground engaging tools are attached. U.S. Pat. No. 7,861,795 to Dillon discloses an implement where the front of the wing sections is raised prior to folding the wings rearward. U.S. Pat. No. 9,198,342 to Friggstad discloses an air seeder implement with no center section where the wing frames fold rearward for transport and forward portions of the wing frames fold up. In the operating position the wing frames are connected at both front and rear portions thereof to make a substantially rigid structure.

SUMMARY OF THE INVENTION

The present disclosure provides an agricultural implement apparatus with upward and rearward folding right and left wing frames that overcomes problems in the prior art.

In a first embodiment the present disclosure provides an agricultural implement apparatus comprising a hitch frame with a forward end thereof adapted for attachment to a towing vehicle, and a center frame with a front end thereof pivotally attached to a rear end of the hitch frame about a hitch pivot axis oriented substantially horizontally and perpendicular to an operating travel direction. Center wheels support the rear end of the hitch frame for travel in the operating travel direction and right and left interframes are pivotally attached to corresponding right and left ends of the center frame about corresponding right and left wing pivot axes. Right and left wing frames are pivotally attached at front inner ends thereof to corresponding front ends of the right and left interframes about corresponding right and left substantially parallel front interframe pivot axes. Rear inner portions of the right and left wing frames are movably attached to corresponding rear portions of the right and left interframes such that in a transport configuration each of the right and left wing frames is pivotable about the corresponding right and left front interframe pivot axes. Right and left latch mechanisms are each selectively operative to lock the rear inner portion of the corresponding wing frame to the corresponding interframe in a working configuration where pivotal movement about the corresponding front interframe pivot axis is prevented. A center actuator is operative to pivot the center frame about the hitch pivot axis such that the center frame, the right and left interframes, and the right and left wing frames move from an operating position extending rearward from the hitch pivot axis to an initial transport position extending upward from the hitch pivot axis. The right and left wing pivot axes are in a substantially horizontal orientation parallel to the operating travel direction when the center frame, the right and left interframes, and the right and left wing frames are in the operating position, and the right and left wing pivot axes are in a substantially upright orientation when the center frame, the right and left interframes, and the right and left wing frames are in the initial transport position. The front interframe pivot axes are oriented substantially perpendicular to the wing pivot axes and are in a substantially vertical orientation when the center frame, the right and left interframes, and the right and left wing frames are in the operating position. The right and left interframes and the right and left wing frames pivot about the upright wing pivot axes from the initial transport position extending laterally outward from the corresponding right and left ends of the center frame to a final transport position extending rearward from the corresponding right and left ends of the center frame.

In a second embodiment the present disclosure provides an agricultural implement apparatus comprising a center frame supported on center wheels for travel in an operating travel direction, and right and left interframes pivotally attached to corresponding right and left ends of the center frame about corresponding right and left wing pivot axes. Right and left wing frames are pivotally attached at front inner ends thereof to corresponding front ends of the right and left interframes about corresponding right and left substantially parallel front interframe pivot axes. Rear inner portions of the right and left wing frames are movably attached to corresponding rear portions of the right and left interframes such that the each of the right and left wing frames are movable away from and toward the corresponding right and left interframes as the right and left wing frames pivot about the corresponding interframe pivot axes. Right and left latch mechanisms are each operative to releasably attach the rear inner portion of the corresponding wing frame to the corresponding interframe such that pivotal movement about the corresponding right and left front interframe pivot axes of each wing frame with respect to the corresponding interframe is prevented. A center actuator is operative to pivot the center frame, the right and left interframes, and the right and left wing frames from an operating position extending rearward, to an initial transport position extending upward. The right and left wing pivot axes are in a substantially horizontal orientation parallel to the operating travel direction when the center frame, the right and left interframes, and the right and left wing frames are in the operating position, and the right and left wing pivot axes are in a substantially upright orientation when the center frame, the right and left interframes, and the right and left wing frames are in the initial transport position. The front interframe pivot axes are oriented substantially perpendicular to the wing pivot axes and are in a substantially vertical orientation when the center frame, the right and left interframes, and the right and left wing frames are in the operating position. The right and left interframes, and the right and left wing frames attached thereto, pivot about the upright wing pivot axes from the initial transport position extending laterally outward from the corresponding right and left ends of the center frame to a final transport position extending rearward from the corresponding right and left ends of the center frame.

The present disclosure provides an implement apparatus with improved transport and operating characteristics. The implement apparatus has rear folding wing frames that are free to float up and down with respect to the center frame to follow the ground when folded upward and rearward for transport, and also are secured to the center frame at front and rear ends thereof when folded downward and extending laterally during field operations.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
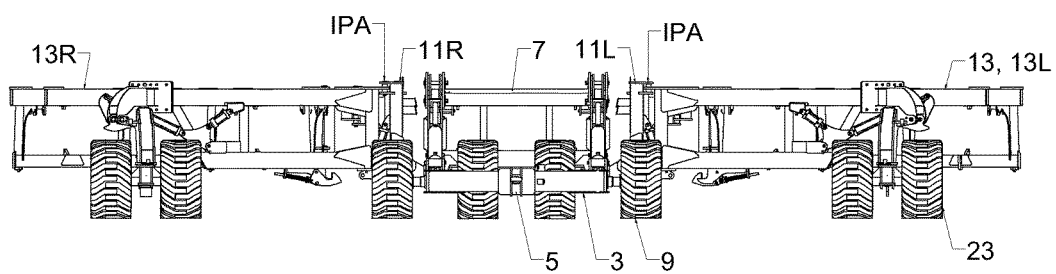
FIG. 1 is a front view of an embodiment of an embodiment of an agricultural implement apparatus of the present disclosure in an operating position.
Figure 2:
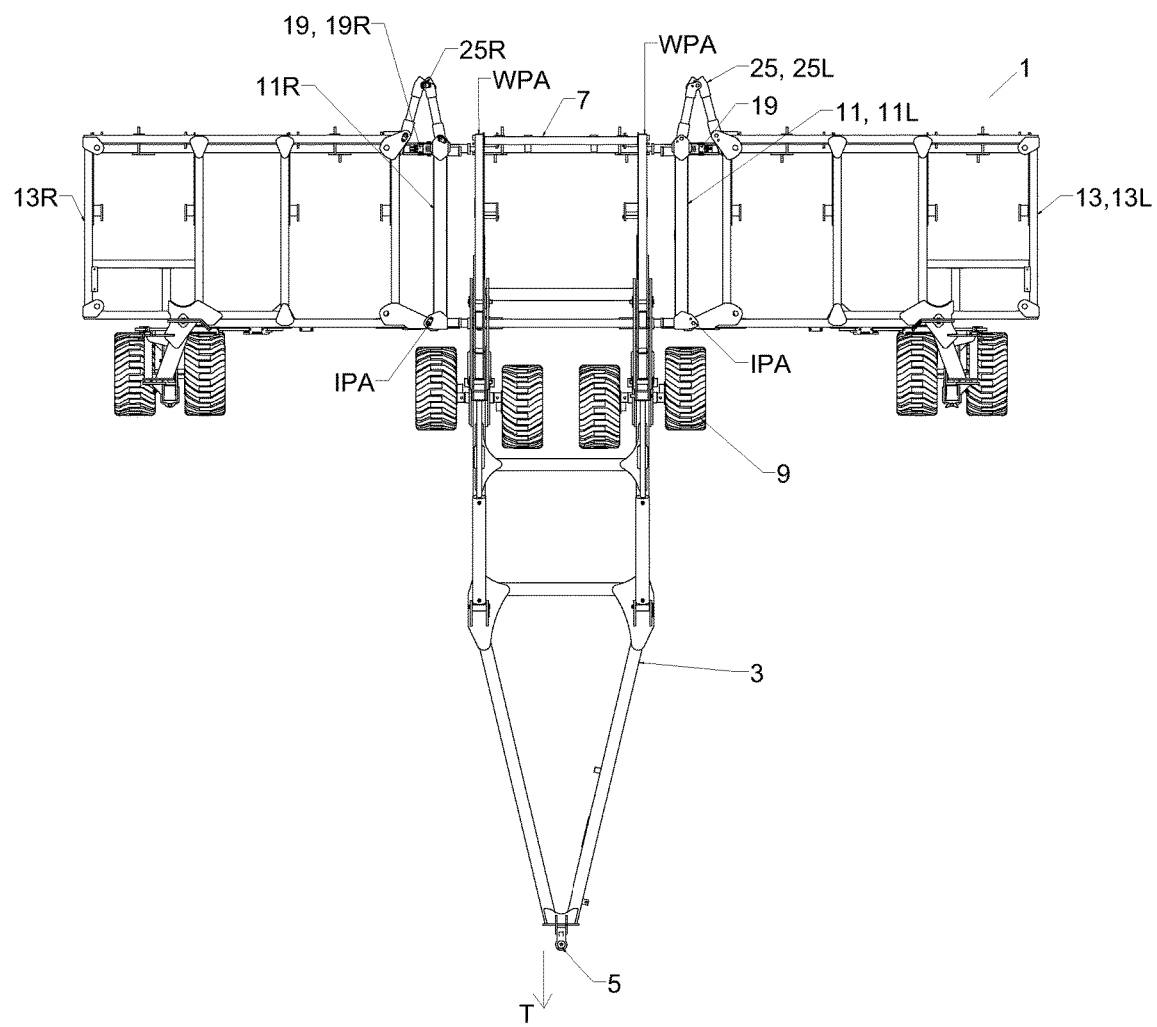
FIG. 2 is a top view of the embodiment of FIG. 1 in the operating position with the latch mechanisms engaged to maintain the wing frames in alignment with the center frame for field operation.

FIGS. 1 and 2 illustrate an embodiment of an agricultural implement apparatus 1 of the present disclosure. The apparatus 1 comprises a hitch frame 3 with a forward end 5 thereof adapted for attachment to a towing vehicle (not shown). A center frame 7 has a front end thereof pivotally attached to a rear end of the hitch frame 3 about a hitch pivot axis HPA oriented substantially horizontally and perpendicular to an operating travel direction T. Center wheels 9 support the rear end of the hitch frame 3 for travel in the operating travel direction T.

Right and left interframes 11R, 11L are pivotally attached to corresponding right and left ends of the center frame 7 about corresponding right and left wing pivot axes WPA.

Right and left wing frames 13R, 13L are pivotally attached at front inner ends thereof to corresponding front ends of the interframes 11 about corresponding right and left substantially parallel front interframe pivot axes IPA. In a typical implement apparatus 1 ground engaging tools such as discs, shanks, harrows, or the like are mounted on the center frame 7 and wing frames 13 as is known in the art and for clarity of illustration are not shown.

Figure 3:
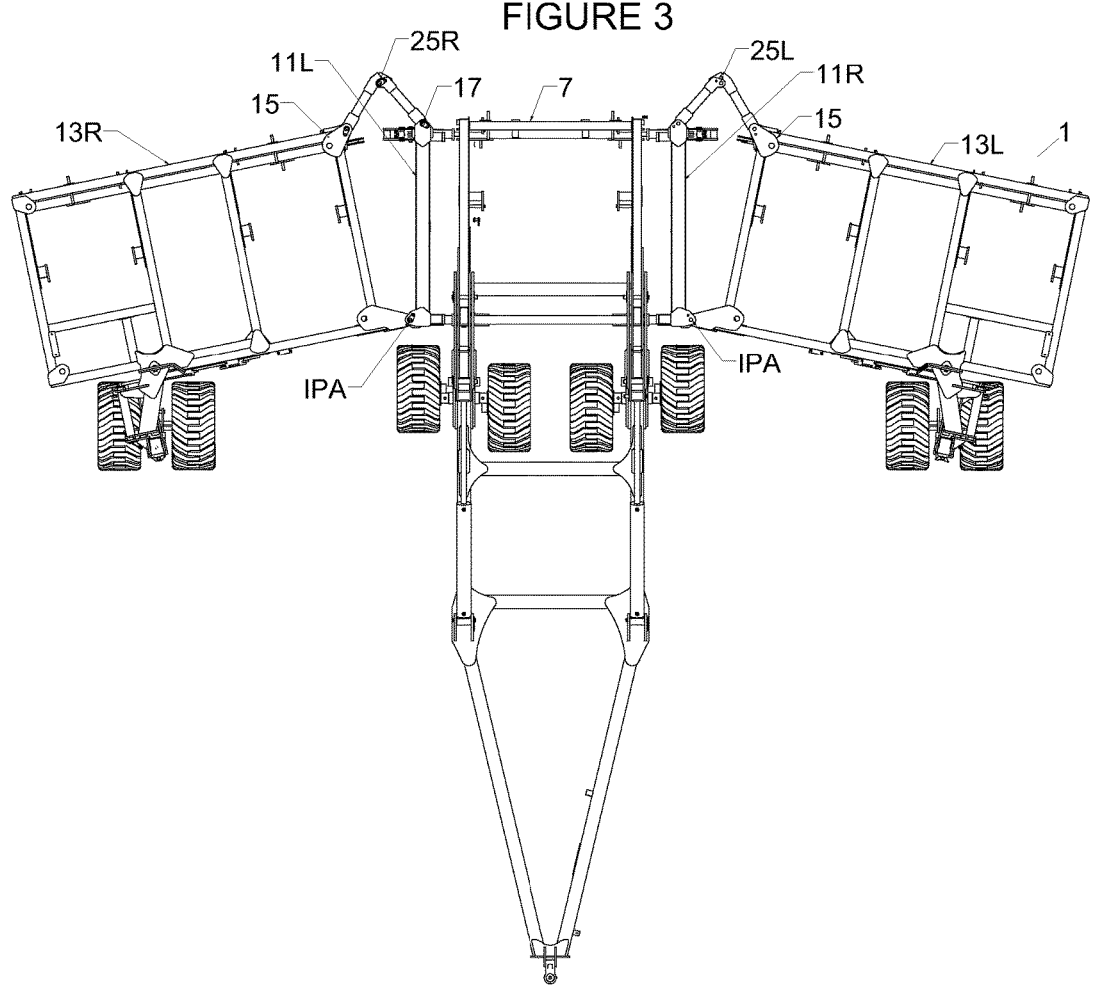
FIG. 3 is a top view of the embodiment of FIG. 1 in the operating position with the latch mechanisms disengaged and the outer ends of the wing frames slightly forward of the center frame.
Figure 4:
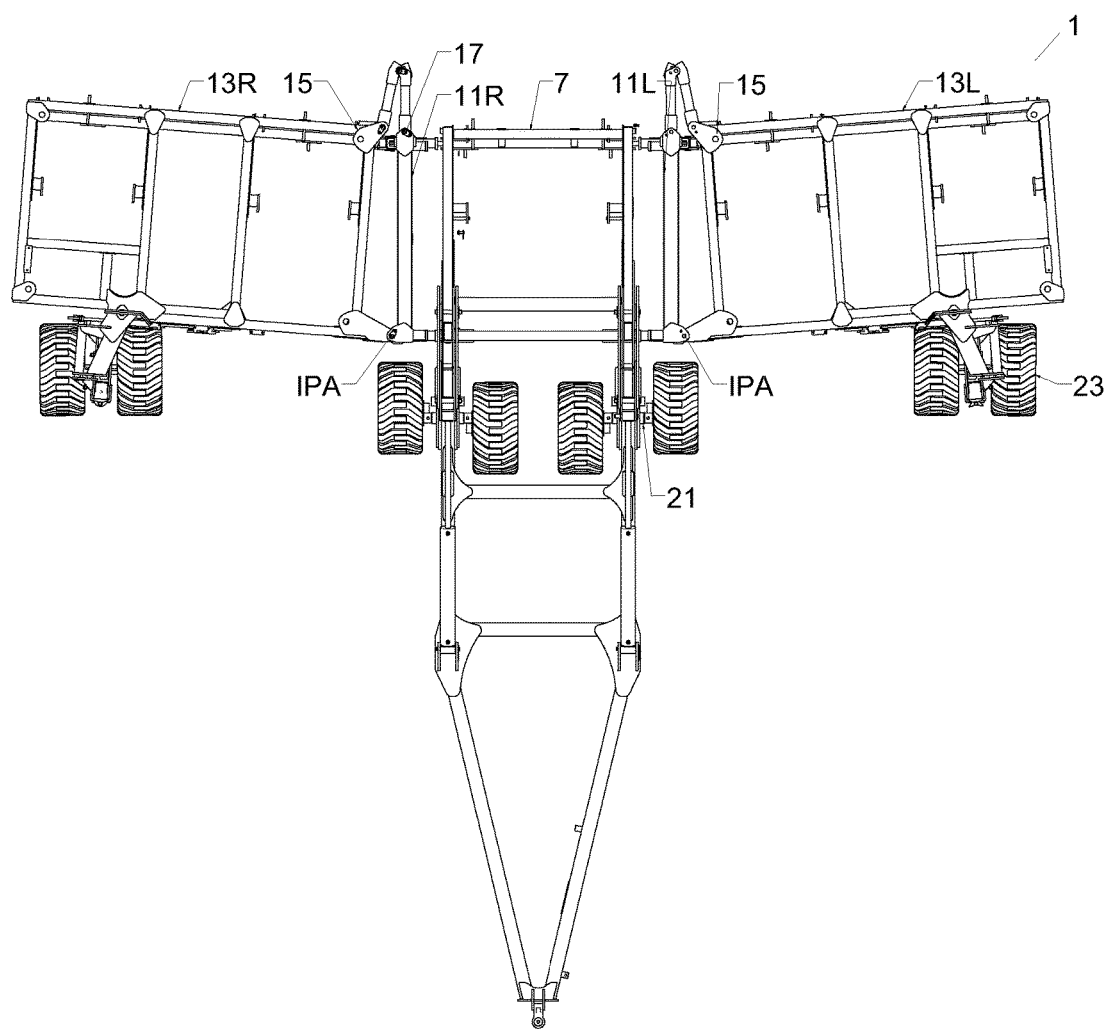
FIG. 4 is a top view of the embodiment of FIG. 1 in the operating position with the latch mechanisms disengaged and the outer ends of the wing frames slightly rearward of the center frame.

Rear inner portions 15 of the wing frames 13 are movably attached to corresponding rear portions 17 of the right and left interframes 11 such that in a transport configuration each wing frame 13 is free to pivot about the corresponding interframe pivot axes IPA from the position shown in FIG. 3 to the position shown in FIG. 4.

Right and left latch mechanisms 19R, 19L are each selectively operative to lock the rear inner portion 15 of the corresponding wing frame 13 to the corresponding interframe 11 in a working configuration where pivotal movement about the corresponding front interframe pivot axis IPA is prevented, and the wing frames 13 are secured in the position shown in FIG. 2. The latch mechanisms 19 releasably attach the inner portion 15 of the corresponding wing frame 13 to the corresponding interframe 11.

Figure 5:
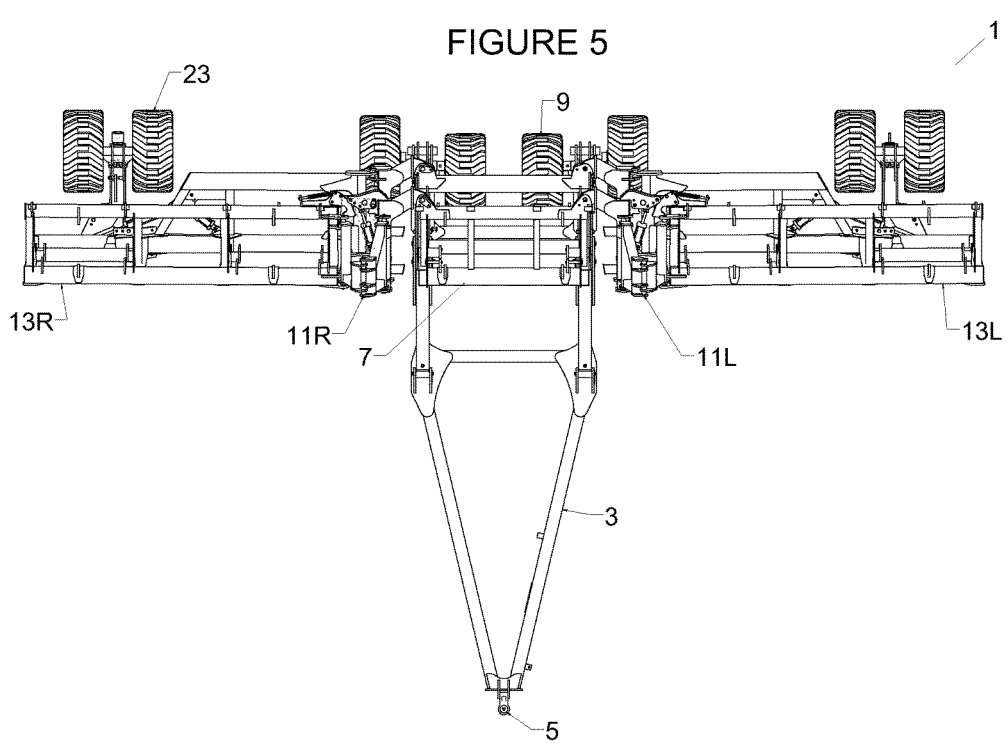
FIG. 5 is a top view of the embodiment of FIG. 1 with the center frame, interframes, and wing frames oriented upright in the initial transport position.
Figure 6:
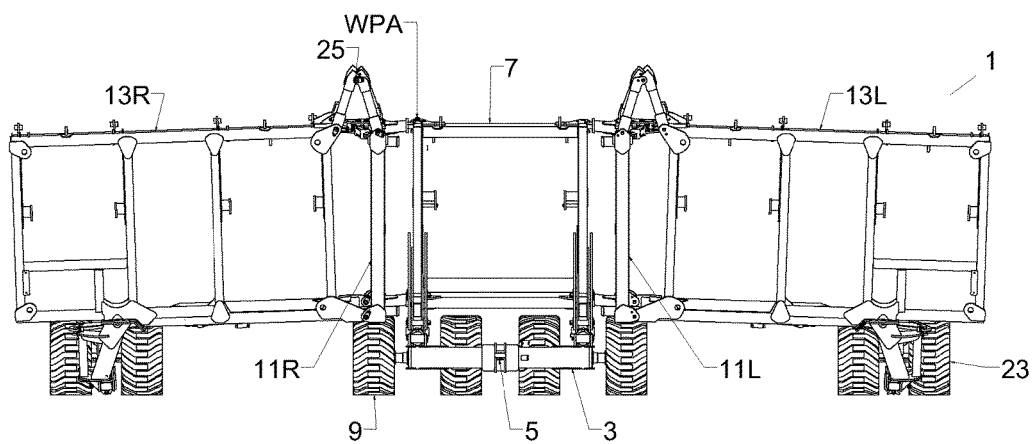
FIG. 6 is a front view of the embodiment of FIG. 1 with the center frame, interframes, and wing frames oriented upright in the initial transport position.

A center actuator, provided by center hydraulic cylinders 21, is operative to pivot the center frame 7 about the hitch pivot axis HPA such that the center frame 7, the right and left interframes 11R, 11L, and the right and left wing frames 13R, 13L move from an operating position extending rearward from the hitch pivot axis HPA to an initial transport position extending upward from the hitch pivot axis HPA as shown in FIGS. 5 and 6. The movable attachment of the rear inner portions 15 of the wing frames 13 to corresponding rear portions 17 of the right and left interframes 11 is described further below, but in any event is configured such that when the center frame 7 is pivoted upward about the hitch pivot axis HPA the interframes 11 and wing frames 13 move upward together with the center frame 7. The latch mechanisms 19 are disengaged to allow the wing frames 13 to pivot about the corresponding interframe pivot axes WA.

The right and left wing pivot axes WPA are in a substantially horizontal orientation parallel to the operating travel direction T when the center frame 7, the right and left interframes 11R, 11L, and the right and left wing frames 13R, 13L are in the operating position of FIGS. 1 and 2, and the right and left wing pivot axes WPA are in a substantially upright orientation when the center frame 7, the right and left interframes 11R, 11L, and the right and left wing frames 13R, 13L are in the initial transport position of FIGS. 5 and 6.

The front interframe pivot axes IPA are oriented substantially perpendicular to the wing pivot axes WPA and are in a substantially vertical orientation when the center frame 7, the right and left interframes 11R, 11L, and the right and left wing frames 13R, 13L are in the operating position of FIGS. 1 and 2.

Figure 7:
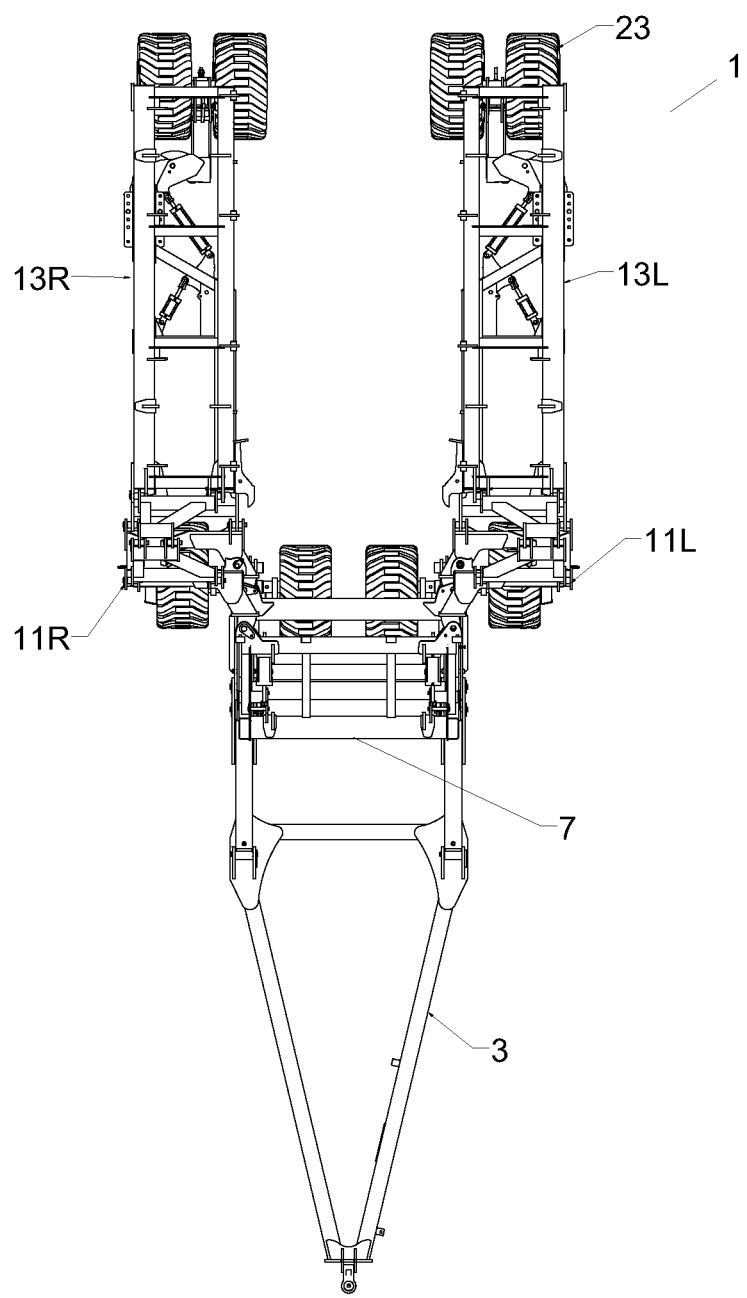
FIG. 7 is a top view of the embodiment of FIG. 1 with the center frame, interframes, and wing frames oriented upright in the final transport position.

Once the initial transport position of FIGS. 5 and 6 is attained, the towing vehicle moves in the operating travel direction T, the outer wheels 23 pivot to a transport position and the interframes 11, and wing frames 13 pivot about the upright wing pivot axes WPA from the initial transport position extending laterally outward from the corresponding right and left ends of the center frame 7 to a final transport position shown in FIG. 7 extending rearward from the corresponding right and left ends of the center frame 7.

Figure 8:
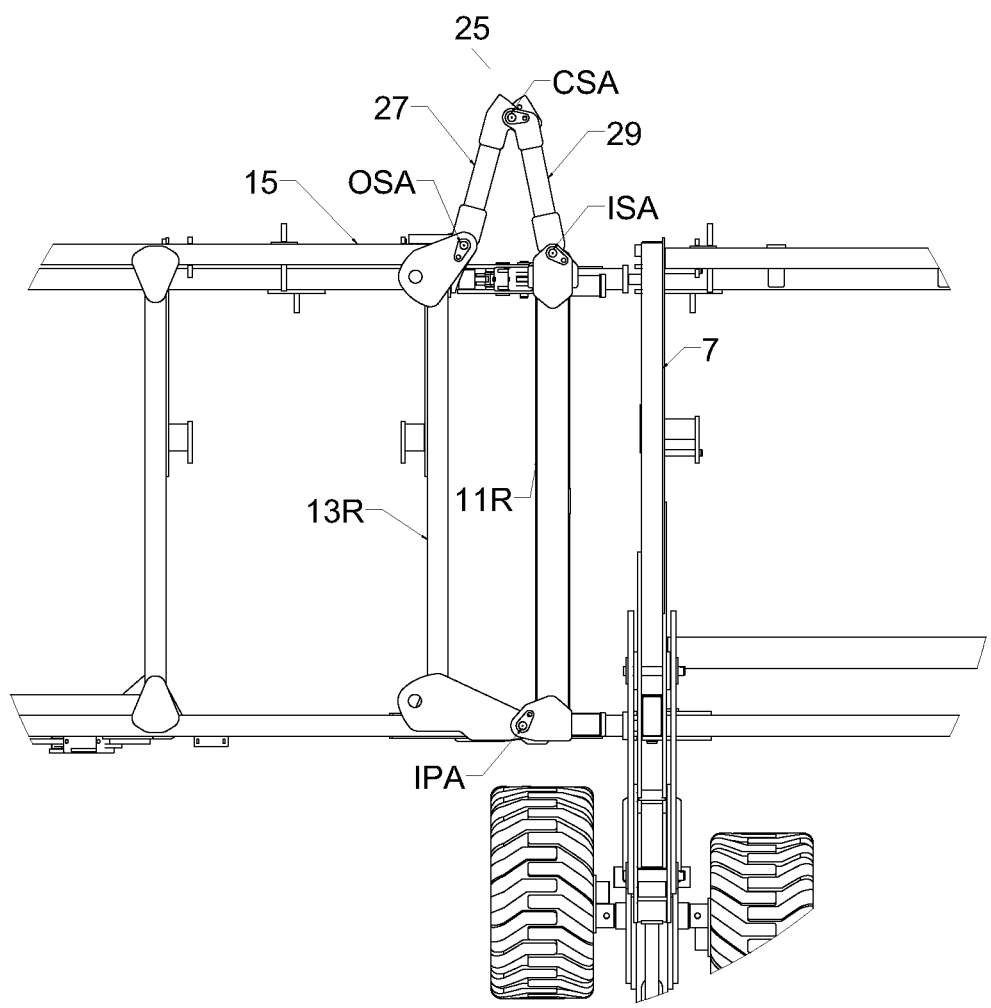
FIG. 8 is a top view of right interframe of the embodiment of FIG. 1 showing the connection thereof to the center frame and right wing frame.

In the illustrated apparatus 1, the rear inner portions 15 of the right and left wing frames 13 are movably attached to the corresponding rear portions 17 of the right and left interframes 11 by corresponding right and left scissor assemblies 25R, 25L. As seen in more detail in FIG. 8, each scissor assembly 25 comprises an outer arm 27 pivotally attached to an inner arm 29 about a center scissor axis CSA oriented substantially parallel to the front interframe pivot axes IPA. The outer arm 27 is pivotally attached at an outer end thereof to a rear inner end of the corresponding wing frame 13 about an outer scissor pivot axis OSA which is also oriented substantially parallel to the front interframe pivot axes IPA, and the inner arm 29 is pivotally attached at an inner end thereof to a rear end of the corresponding interframe 11 about an inner scissor pivot axis ISA which is again oriented substantially parallel to the front interframe pivot axes IPA.

Figure 9:
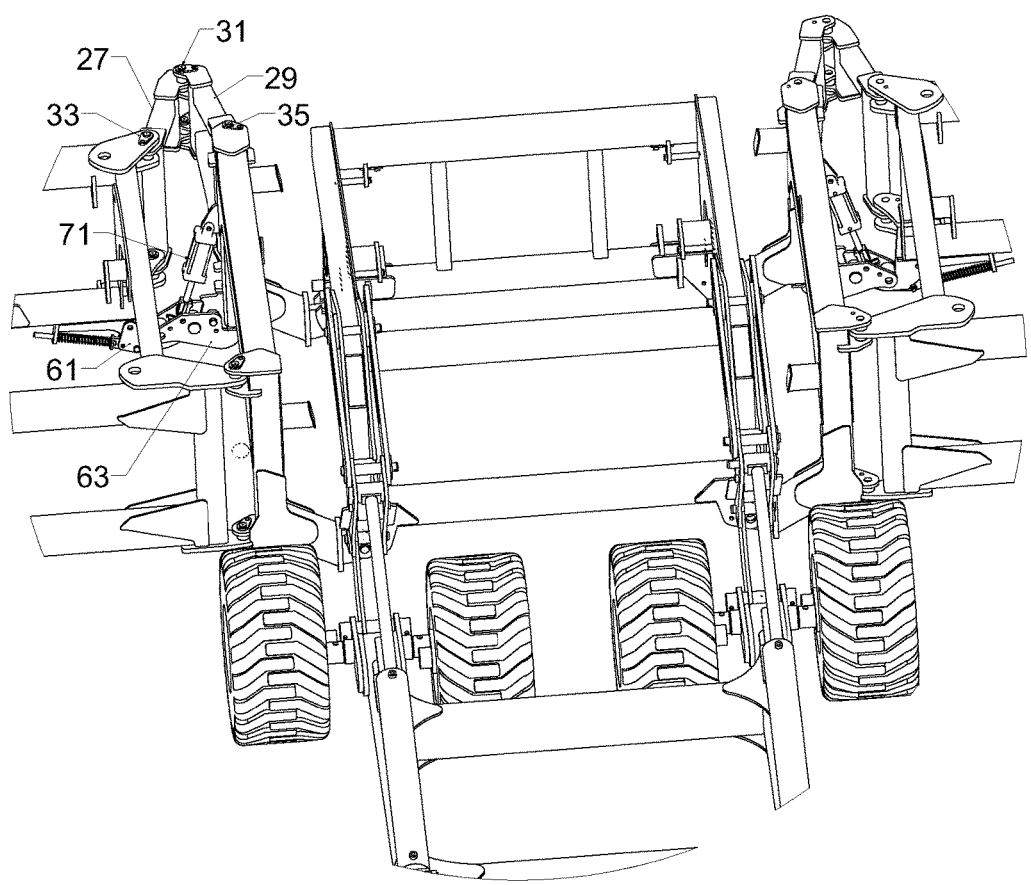
FIG. 9 is front perspective view of the embodiment of FIG. 1 showing the latch mechanisms engaged to lock the interframes to the corresponding wing frames.
Figure 10:
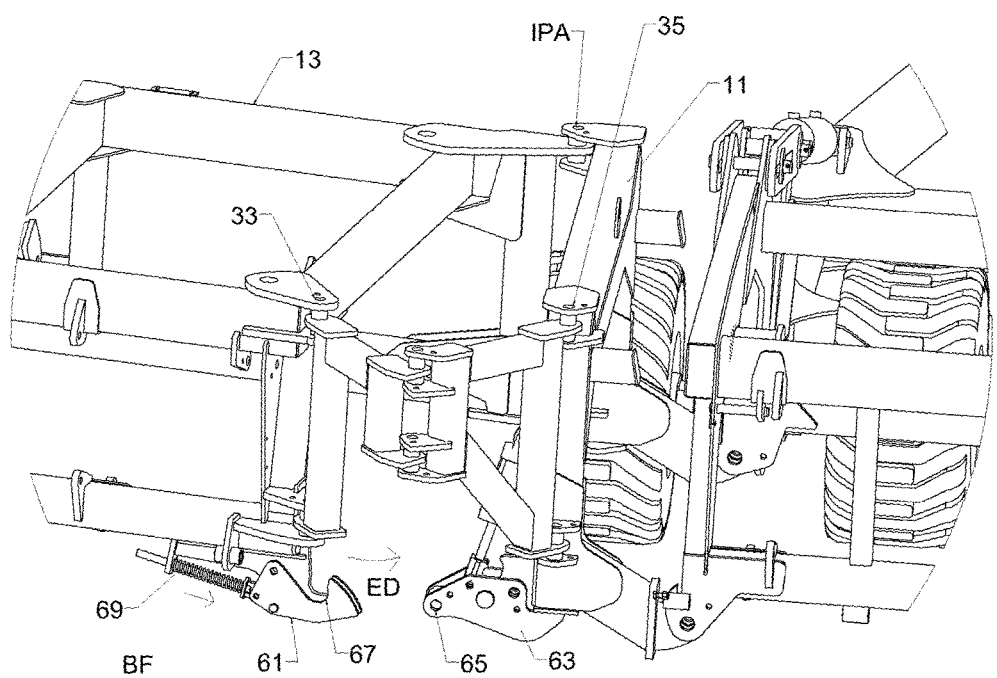
FIG. 10 is rear perspective view of the embodiment of FIG. 1 showing the left latch mechanism disengaged, the left scissor assembly open, and the left wing frame moved away from the corresponding left interframe.

To provide sufficient support to raise the wing frame 13 with the interframe 11 the outer arm 27 is pivotally attached to the inner arm 29 by upper and lower center scissor pins 31 as seen in FIGS. 9 and 10. Similarly the outer arm 27 is pivotally attached at the outer end thereof to the rear inner end of the corresponding wing frame 13 by upper and lower outer scissor pins 33 and the inner arm 29 is pivotally attached at the inner end thereof to the rear end of the corresponding interframe 11 by upper and lower inner scissor pins 35.

Figure 11:
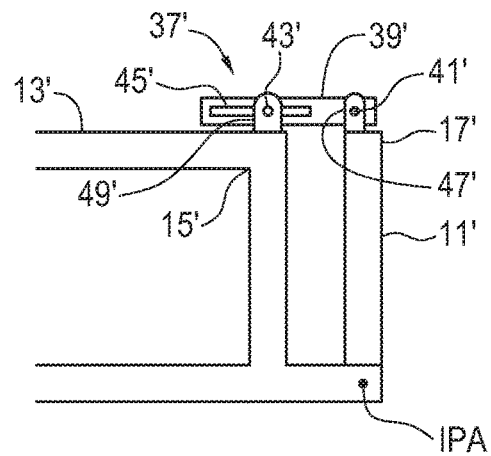
FIGS. 11 and 11A respectively show schematic top and end views of an alternate movable connection between the rear portion of the wing frame and the rear portion of the interframe where the connection is provided by a pivot plate assembly.

FIG. 11 schematically illustrates an alternate movable connection between the rear portion 15' of the wing frame 13' and the rear portion 17' of the interframe 11' where the connection is provided by a pivot plate assembly 37' comprising a slotted pivot plate 39' pivotally attached at an inner end thereof to a rear end of the corresponding interframe 11 by an inner plate pivot pin 41' oriented substantially parallel to the front interframe pivot axis IPA and pivotally attached at an outer end thereof to a rear inner end of the corresponding wing frame 13' by an outer plate pivot pin 43' oriented substantially parallel to the inner plate pivot pin 41' and the front interframe pivot axis IPA. One or the other of the inner and outer plate pivot pins 41', 43' can be configured to move in the slot 45' defined by the slotted plate 39' to allow the wing frame 13' to pivot with respect to the interframe 11' about the front interframe pivot axis IPA. In the illustrated pivot plate assembly 37' the outer plate pivot pin 43' moves in the slot 45.

Figure 11A:
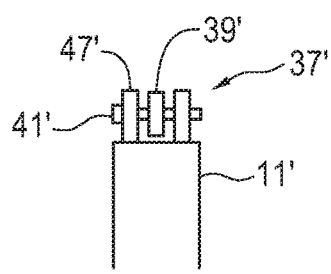

As schematically illustrated in FIG. 11A, the inner plate pivot pin 41' extends through first and second interframe brackets 47' attached to the rear end of the interframe 11', and the outer plate pivot pin 43' similarly extends through first and second wing brackets 49' attached to the rear inner end of the corresponding wing frame 13'. The slotted pivot plate 39' is located between the corresponding first and second interframe brackets 47' and between the corresponding first and second wing brackets 49'.

Figure 12:
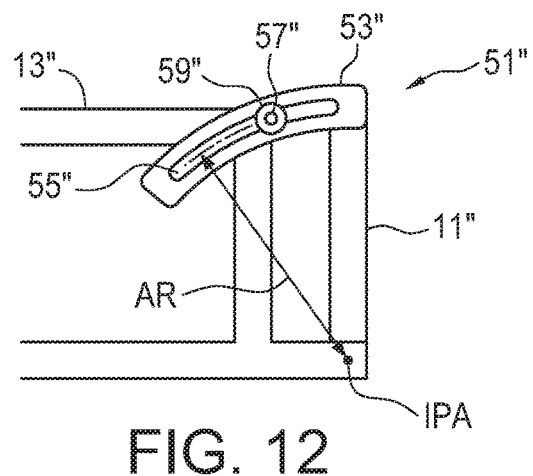
FIG. 12 is a schematic top view of a further alternate movable connection between the rear portion of the wing frame and the rear portion of the interframe where the connection is provided by a fixed plate assembly.

FIG. 12 schematically illustrates a further alternate movable connection between the rear portion 15" of the wing frame 13" and the rear portion 17" of the interframe 11" where the connection is provided by a fixed plate assembly 51". The fixed plate assembly 51" comprises slotted fixed plate 53" pivotally fixed at a first end thereof to the rear end of the interframe 11", and a curved slot 55" defined by the fixed plate 53". The curved slot 55" is configured to follow the arc of a circle with the center of the circle coincidental with the front interframe pivot axis IPA, and a radius AR. A guide pin 57" extends from the rear inner end of the wing frame 13" and through the curved slot 55" to a pin head 59" which keeps the guide pin 57" in the slot 55". The radius AR is the same as the distance D from the guide pin 57" to the front interframe pivot axis IPA so the curved slot 55" is configured such that the guide pin 57" moves along the curved slot 55" when the corresponding wing frame 13" pivots with respect to the interframe 11 about the front interframe pivot axis IPA.

It is contemplated that the fixed plate 53" could also be fixed instead to the rear inner end of the wing frame 13" with the guide pin 57" fixed to the interframe 11".

The illustrated latch mechanisms 19 comprise, as seen in FIG. 10, a first latch member 61 movably attached to the wing frame 13 and a second latch member 63 attached to the corresponding interframe 11. The second latch member comprises a latch bar 65 and the first latch member 61 defines a latch hook 67 configured to secure the latch bar 65 when the first latch member 61 is in the engaged position and the second latch member 63 is in an engageable position. A bias element 69 is operative to exert a bias force BF urging the first latch member 61 toward the engaged position illustrated in FIG. 10.

Figure 13:
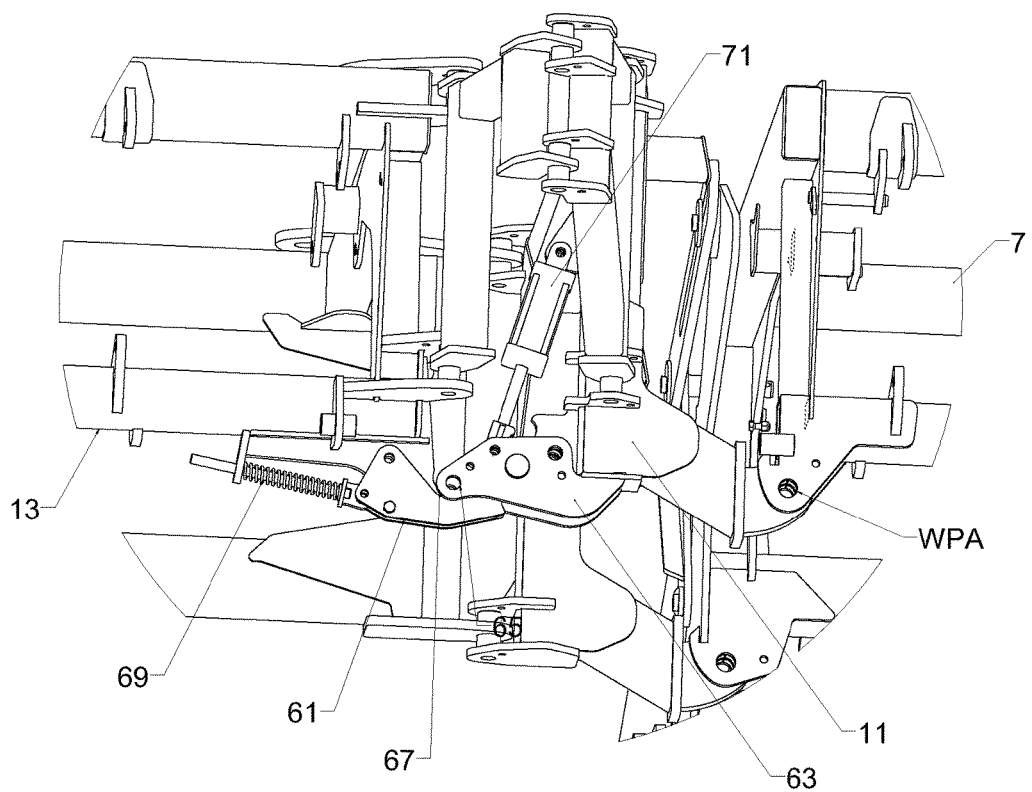
FIG. 13 is a rear perspective view of the left latch assembly of the embodiment of FIG. 1 in the engaged position with the latch bar engaged in the latch hook and thereby securing the left wing frame to the left interframe.

The first and second latch members 61, 63 are configured such that when the wing frame 13 pivots toward the corresponding interframe 11 about the corresponding front interframe pivot axis IPA in engaging direction ED, the second latch member 63 contacts the first latch member 61 and forces the first latch member 61 away from the engaged position until the second latch member 63 is in an engageable position as shown in FIG. 13, at which point the bias force BF moves the first latch member 61 to the engaged position such that the latch bar 65 is in the latch hook 67 securing the second latch member 63 to the first latch member. Maneuvering the apparatus 1 with the towing vehicle as is known in the art can achieve the desired relative motion in the direction ED to engage the latch mechanisms 19.

A latch actuator 71 is operative to release the second latch member 63 from the first latch member 61. In the illustrated apparatus 1 the second latch member 63 is, like the first latch member 61, also movably attached to the interframe 11 and the latch actuator 71 is operative to move the latch bar 65 of the second latch member 63 out of the engageable position as seen in FIG. 14 to release the latch bar 65 from the latch hook 67.

Figure 14:
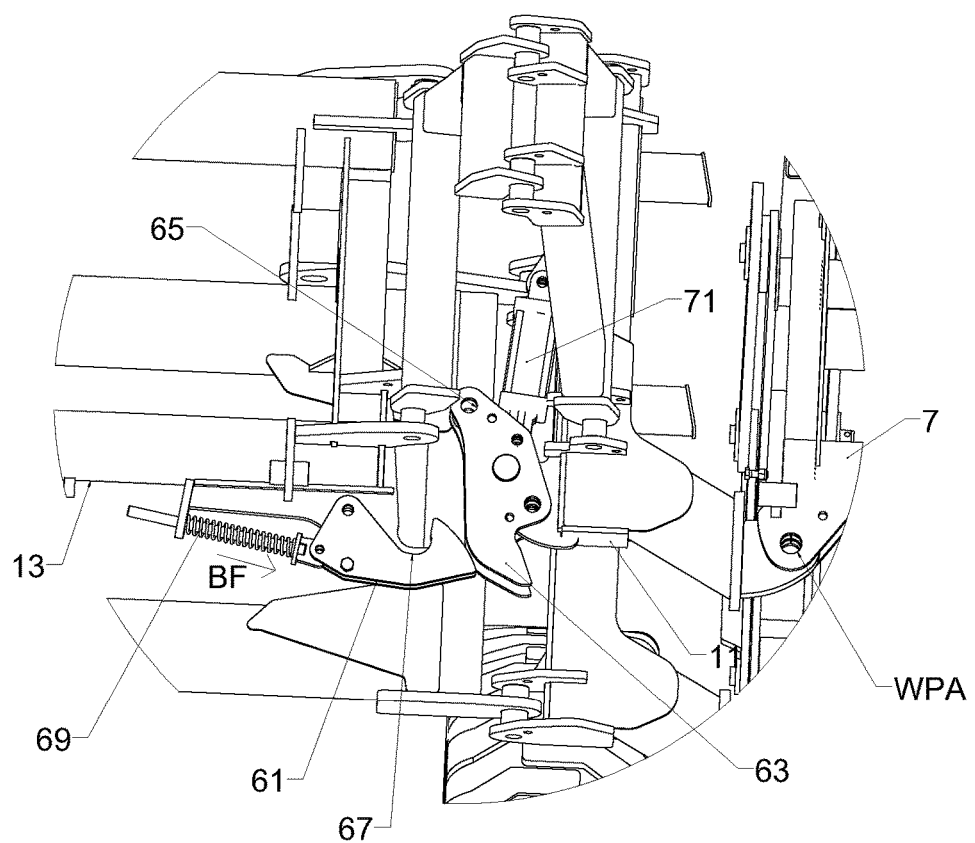
FIG. 14 is a rear perspective view of the left latch assembly of the embodiment of FIG. 1 in a disengaged position with the latch bar moved out of engagement with the latch hook such that the left wing frame and the left interframe can move toward or away from each other.
Figure 17:
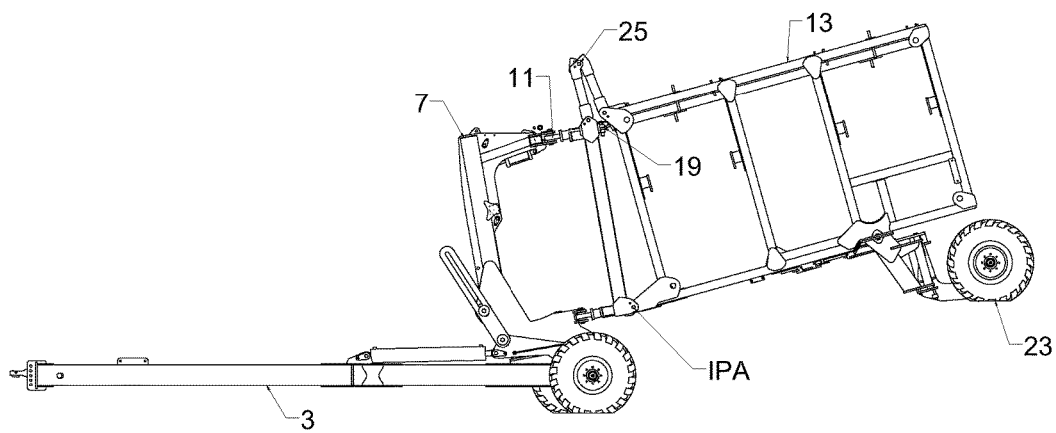
FIG. 17 is a side view of the embodiment of FIG. 1 in the final transport position on uneven ground with rear outer wheels above the front center wheels.

Moving the second latch member 63 as shown in FIG. 14 allows the first latch member 61 to move past the second latch member 63 so that the attached wing frame 13 can move closer to the interframe 11 to attain the position illustrated in FIG. 4 and also in FIG. 17 described below, where the rear inner portion 15 of each wing frame 13 is closer to the corresponding interframe 11 than when the latch mechanisms 19 are engaged to lock them together.

Figure 15:
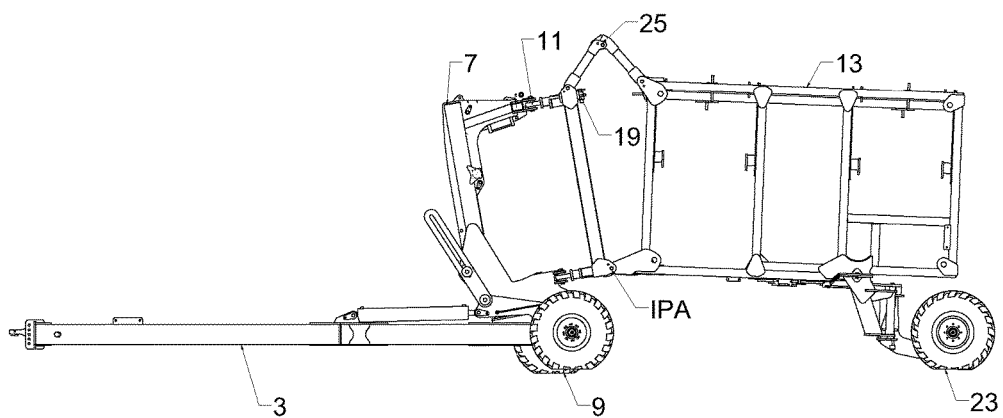
FIG. 15 is a side view of the embodiment of FIG. 1 in the final transport position on substantially level ground with rear outer wheels and front center wheels at the same height.
Figure 16:
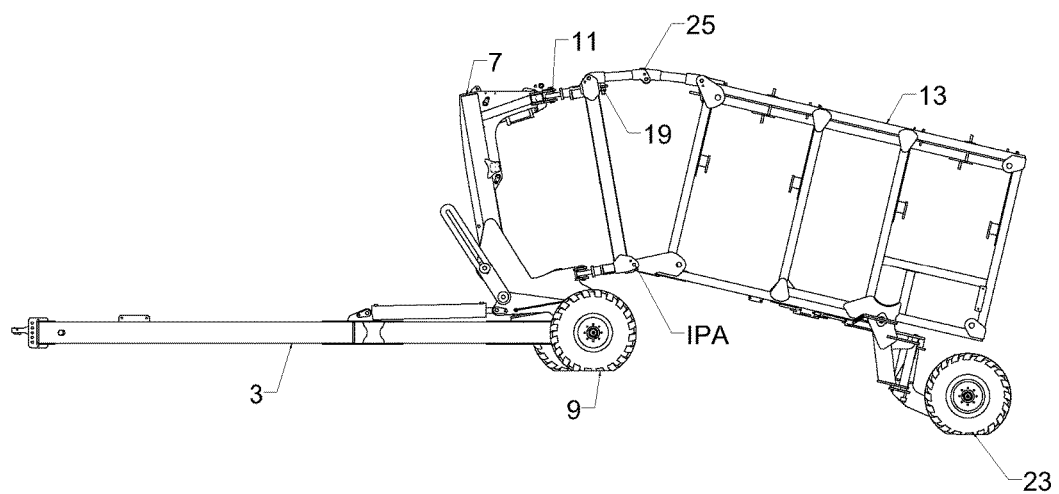
FIG. 16 is a side view of the embodiment of FIG. 1 in the final transport position on uneven ground with rear outer wheels below the front center wheels.
Figure 18:
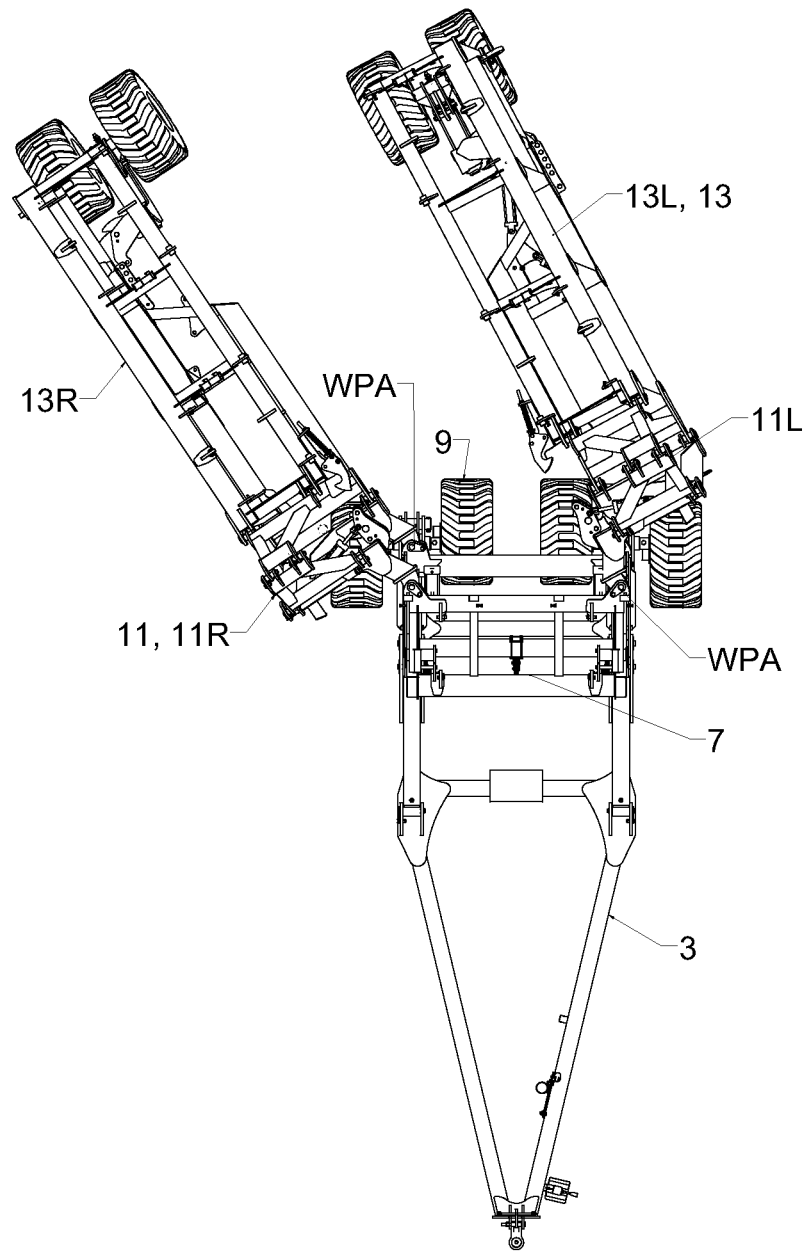
FIG. 18 is a top view of the embodiment of FIG. 1 in the final transport position making a turn.

FIGS. 15-18 show the apparatus 1 in the final transport position, with the wing frames 13 extending rearward from the center frame 7, and the latch mechanisms 19 disengaged so the wing frames 13 are free to pivot with respect to the interframes 11 about the corresponding interframe pivot axes IPA as the scissor assemblies 25 open and close. FIG. 15 shows the apparatus on level ground, while in FIG. 16 the front center wheels 9 are higher than the rear wing wheels 23, and in FIG. 17 the front center wheels 9 are lower than the rear wing wheels 23. FIG. 18 shows that during a turn while in the final transport position the wing frames 13 and interframes 11 pivot about the wheel pivot axes WPA.

Figure 19:
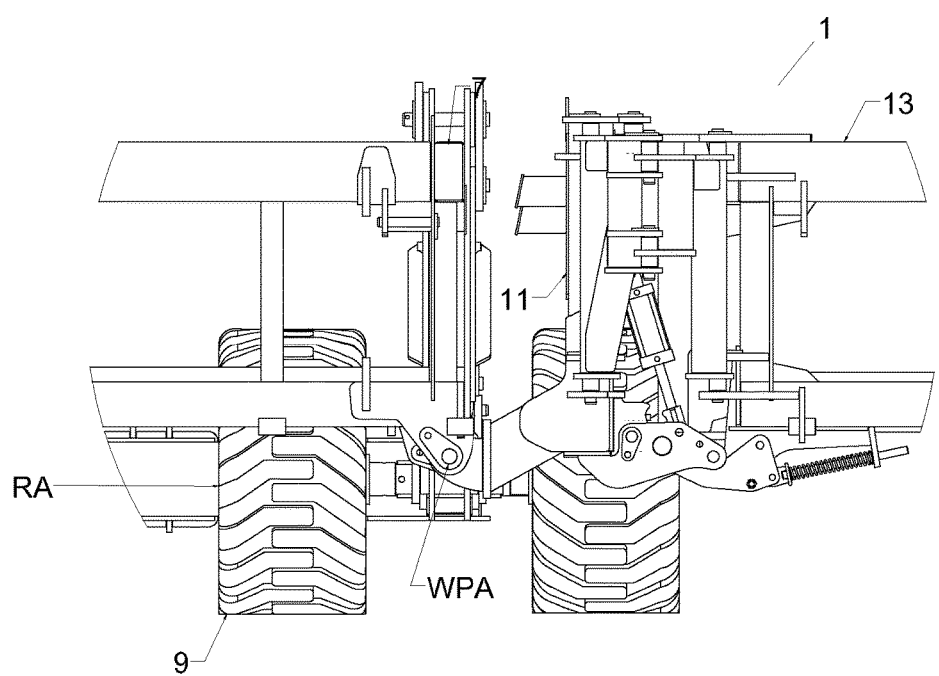
FIG. 19 is a rear view of the embodiment of FIG. 1 showing the low position of the right wing pivot axis.

FIG. 19 shows the apparatus 1 in the operating position and how the interframes are pivotally attached at lower portions thereof about the wing pivot axis WPA to lower portions of the corresponding ends of the center frame 7, such that each wing pivot axis WPA is located at a vertical location in proximity to rotational axes RA of the center wheels 9 when the center frame 7, the interframes 11, and the wing frames 13 are in the operating position. With this low wing pivot axis WPA, the spacing of the ground engaging tools typically attached to the center and wing frames 7, 13, at the point where the tools engage the ground surface, is only slightly affected when the wing frames 13 pivot upward and downward with respect to the center frame 7. As the location of the wing pivot axis WPA moves upward it can be seen the such spacing is increasingly changed as the wing frames 13 pivot up and down.

The present disclosure provides an implement apparatus 1 with improved transport characteristics. The implement apparatus 1 has rear folding wing frames that are free to float up and down with respect to the center frame to follow the ground when folded upward and rearward for transport, and also are secured to the center frame at front and rear ends thereof when folded downward and extending laterally during field operations.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An agricultural implement apparatus comprising:
   a hitch frame with a forward end thereof adapted for attachment to a towing vehicle;
   a center frame with a front end thereof pivotally attached to a rear end of the hitch frame about a hitch pivot axis oriented substantially horizontally and perpendicular to an operating travel direction;
   center wheels supporting the rear end of the hitch frame for travel in the operating travel direction;
   right and left interframes pivotally attached to corresponding right and left ends of the center frame about corresponding right and left wing pivot axes;
   right and left wing frames pivotally attached at front inner ends thereof to corresponding front ends of the right and left interframes about corresponding right and left substantially parallel front interframe pivot axes;
   wherein rear inner portions of the right and left wing frames are movably attached to corresponding rear portions of the right and left interframes such that in a transport configuration each of the right and left wing frames is pivotable about the corresponding right and left front interframe pivot axes;
   right and left latch mechanisms, each latch mechanism selectively operative to lock the rear inner portion of the corresponding wing frame to the corresponding interframe in a working configuration where pivotal movement about the corresponding front interframe pivot axis is prevented;
   a center actuator operative to pivot the center frame about the hitch pivot axis such that the center frame, the right and left interframes, and the right and left wing frames move from an operating position extending rearward from the hitch pivot axis to an initial transport position extending upward from the hitch pivot axis;
   wherein the right and left wing pivot axes are in a substantially horizontal orientation parallel to the operating travel direction when the center frame, the right and left interframes, and the right and left wing frames are in the operating position, and the right and left wing pivot axes are in a substantially upright orientation when the center frame, the right and left interframes, and the right and left wing frames are in the initial transport position;

wherein the front interframe pivot axes are oriented substantially perpendicular to the wing pivot axes and are in a substantially vertical orientation when the center frame, the right and left interframes, and the right and left wing frames are in the operating position;

wherein the right and left interframes, and the right and left wing frames pivot about the upright wing pivot axes from the initial transport position extending laterally outward from the corresponding right and left ends of the center frame to a final transport position extending rearward from the corresponding right and left ends of the center frame.

2. The apparatus of claim 1 wherein the rear inner portions of the right and left wing frames are movably attached to the corresponding rear portions of the right and left interframes by corresponding right and left scissor assemblies, each scissor assembly comprising:

an outer arm pivotally attached to an inner arm about a center scissor axis oriented substantially parallel to the front interframe pivot axes;

wherein the outer arm is pivotally attached at an outer end thereof to a rear inner end of the corresponding wing frame about an outer scissor pivot axis oriented substantially parallel to the front interframe pivot axes; and wherein the inner arm is pivotally attached at an inner end thereof to a rear end of the corresponding interframe about an inner scissor pivot axis oriented substantially parallel to the front interframe pivot axes.

3. The apparatus of claim 2 wherein the outer arm is pivotally attached to the inner arm by upper and lower center scissor pins.

4. The apparatus of claim 2 wherein the outer arm is pivotally attached at the outer end thereof to the rear inner end of the corresponding wing frame by upper and lower outer scissor pins and the inner arm is pivotally attached at the inner end thereof to the rear end of the corresponding interframe by upper and lower inner scissor pins.

5. The apparatus of claim 1 wherein the rear inner portions of the right and left wing frames are movably attached to the corresponding rear portions of the right and left interframes by corresponding right and left pivot plate assemblies, each pivot plate assembly comprising a slotted pivot plate pivotally attached at an inner end thereof to a rear end of the corresponding interframe by an inner plate pivot pin oriented substantially parallel to the front interframe pivot axes and pivotally attached at an outer end thereof to a rear inner end of the corresponding wing frame by an outer plate pivot pin oriented substantially parallel to the inner plate pivot pin, and wherein one of the inner and outer plate pivot pins is movable in a slot defined by the plate.

6. The apparatus of claim 5 wherein each inner plate pivot pin extends through first and second interframe brackets attached to the rear end of the corresponding interframe, and each outer plate pivot pin extends through first and second wing brackets attached to the rear inner end of the corresponding wing frame, and wherein each slotted pivot plate is located between the corresponding first and second interframe brackets and between the corresponding first and second wing brackets.

7. The apparatus of claim 1 wherein the rear inner portions of the right and left wing frames are movably attached to the corresponding rear portions of the right and left interframes by corresponding right and left fixed plate assemblies, each fixed plate assembly comprising:

a slotted fixed plate pivotally fixed at a first end thereof to one of a rear end of the corresponding interframe and a rear inner end of the corresponding wing frame;

a curved slot defined by the fixed plate;

a guide pin extending from the other one of the rear end of the corresponding interframe and the rear inner end of the corresponding wing frame and through the curved slot to a pin head;

wherein the curved slot is configured such that the guide pin moves along the curved slot when the corresponding wing frame pivots about the corresponding front interframe pivot axis.

8. The apparatus of claim 1 wherein each latch mechanism comprises:

a first latch member movably attached to one of the wing frame and the corresponding interframe, a second latch member attached to the other of the wing frame and the corresponding interframe;

a bias element operative to exert a bias force urging the first latch member toward an engaged position;

the first and second latch members configured such that when the wing frame pivots toward the corresponding interframe about the corresponding front interframe pivot axis, the second latch member contacts the first latch member and forces the first latch member away from the engaged position until the second latch member is in an engageable position, and when the second latch member is in the engageable position the bias force moves the first latch member to the engaged position securing the second latch member to the first latch member; and a latch actuator operative to release the second latch member from the first latch member.

9. The apparatus of claim 8 wherein the second latch member is movably attached to the other of the wing frame and the corresponding interframe and the latch actuator is operative to move the second latch member out of the engageable position to release the second latch member from the first latch member.

10. The apparatus of claim 9 wherein the second latch member comprises a latch bar and the first latch member defines a latch hook configured to secure the latch bar when the first latch member is in the engaged position and the second latch member is in the engageable position.

11. The apparatus of claim 1 wherein the right and left interframes are pivotally attached at lower portions thereof about the corresponding right and left wing pivot axes to lower portions of the corresponding right and left ends of the center frame, such that the right and left wing pivot axes are located at a vertical location in proximity to rotational axes of the center wheels when the center frame, the right and left interframes, and the right and left wing frames are in the operating position.

12. An agricultural implement apparatus comprising:

a center frame supported on center wheels for travel in an operating travel direction;

right and left interframes pivotally attached to corresponding right and left ends of the center frame about corresponding right and left wing pivot axes;

right and left wing frames pivotally attached at front inner ends thereof to corresponding front ends of the right and left interframes about corresponding right and left substantially parallel front interframe pivot axes;

wherein rear inner portions of the right and left wing frames are movably attached to corresponding rear portions of the right and left interframes such that the each of the right and left wing frames are movable away from and toward the corresponding right and left interframes as the right and left wing frames pivot about the corresponding interframe pivot axes;

right and left latch mechanisms, each latch mechanism operative to releasably attach the rear inner portion of the corresponding wing frame to the corresponding interframe such that pivotal movement about the corresponding right and left front interframe pivot axes of each wing frame with respect to the corresponding interframe is prevented;

a center actuator operative to pivot the center frame, the right and left interframes, and the right and left wing frames from an operating position extending rearward, to an initial transport position extending upward;

wherein the right and left wing pivot axes are in a substantially horizontal orientation parallel to the operating travel direction when the center frame, the right and left interframes, and the right and left wing frames are in the operating position, and the right and left wing pivot axes are in a substantially upright orientation when the center frame, the right and left interframes, and the right and left wing frames are in the initial transport position;

wherein the front interframe pivot axes are oriented substantially perpendicular to the wing pivot axes and are in a substantially vertical orientation when the center frame, the right and left interframes, and the right and left wing frames are in the operating position;

wherein the right and left interframes, and the right and left wing frames attached thereto, pivot about the upright wing pivot axes from the initial transport position extending laterally outward from the corresponding right and left ends of the center frame to a final transport position extending rearward from the corresponding right and left ends of the center frame.

13. The apparatus of claim 12 wherein the rear inner portions of the right and left wing frames are movably attached to the corresponding rear portions of the right and left interframes by corresponding right and left scissor assemblies, each scissor assembly comprising:

an outer arm pivotally attached to an inner arm about a center scissor axis oriented substantially parallel to the front interframe pivot axes;

wherein the outer arm is pivotally attached at an outer end thereof to a rear inner end of the corresponding wing frame about an outer scissor pivot axis oriented substantially parallel to the front interframe pivot axes; and wherein the inner arm is pivotally attached at an inner end thereof to a rear end of the corresponding interframe about an inner scissor pivot axis oriented substantially parallel to the front interframe pivot axes.

14. The apparatus of claim 13 wherein the outer arm is pivotally attached to the inner arm by upper and lower center scissor pins.

15. The apparatus of claim 13 wherein the outer arm is pivotally attached at the outer end thereof to the rear inner end of the corresponding wing frame by upper and lower outer scissor pins and the inner arm is pivotally attached at the inner end thereof to the rear end of the corresponding interframe by upper and lower inner scissor pins.

16. The apparatus of claim 13 wherein the rear inner portions of the right and left wing frames are movably attached to the corresponding rear portions of the right and left interframes by corresponding right and left pivot plate assemblies, each pivot plate assembly comprising a slotted pivot plate pivotally attached at an inner end thereof to a rear end of the corresponding interframe by an inner plate pivot pin oriented substantially parallel to the front interframe pivot axes and pivotally attached at an outer end thereof to a rear inner end of the corresponding wing frame by an outer plate pivot pin oriented substantially parallel to the inner plate pivot pin, and wherein one of the inner and outer plate pivot pins is movable in a slot defined by the plate.

17. The apparatus of claim 13 wherein the rear inner portions of the right and left wing frames are movably attached to the corresponding rear portions of the right and left interframes by corresponding right and left fixed plate assemblies, each fixed plate assembly comprising:

a slotted fixed plate pivotally fixed at a first end thereof to one of a rear end of the corresponding interframe and a rear inner end of the corresponding wing frame;

a curved slot defined by the fixed plate;

a guide pin extending from the other one of the rear end of the corresponding interframe and the rear inner end of the corresponding wing frame and through the curved slot to a pin head;

wherein the curved slot is configured such that the guide pin moves along the curved slot when the corresponding wing frame pivots about the corresponding front interframe pivot axis.

18. The apparatus of claim 12 wherein each latch mechanism comprises:

a first latch member movably attached to one of the wing frame and the corresponding interframe, a second latch attached to the other of the wing frame and the corresponding interframe;

a bias element operative to exert a bias force urging the first latch member toward an engaged position;

the first and second latch members configured such that when the wing frame pivots toward the corresponding interframe about the corresponding front interframe pivot axis, the second latch member contacts the first latch member and forces the first latch member away from the engaged position until the second latch member is in an engageable position, and when the second latch member is in the engageable position the bias force moves the first latch member to the engaged position securing the second latch member to the first latch member; and a latch actuator operative to release the second latch member from the first latch member.

19. The apparatus of claim 18 wherein the second latch member comprises a latch bar movably attached to the other of the wing frame and the corresponding interframe and the first latch member defines a latch hook configured to secure the latch bar when the first latch member is in the engaged position and the second latch member is in the engageable position and the latch actuator is operative to move the second latch member out of the engageable position to release the second latch member from the first latch member.

20. The apparatus of claim 12 wherein the right and left interframes are pivotally attached at lower portions thereof to lower portions of the corresponding right and left ends of the center frame, such that the right and left wing pivot axes are located at a vertical location in proximity to rotational axes of the center wheels when the center frame, the right and left interframes, and the right and left wing frames are in the operating position.

* * * * *